Aug. 29, 1967  C. N. DE BRUIN  3,338,582
PISTON RING SPACER-EXPANDER WITH LANCED
KEY TO INDICATE OVERLAPPED ENDS
Filed July 14, 1964
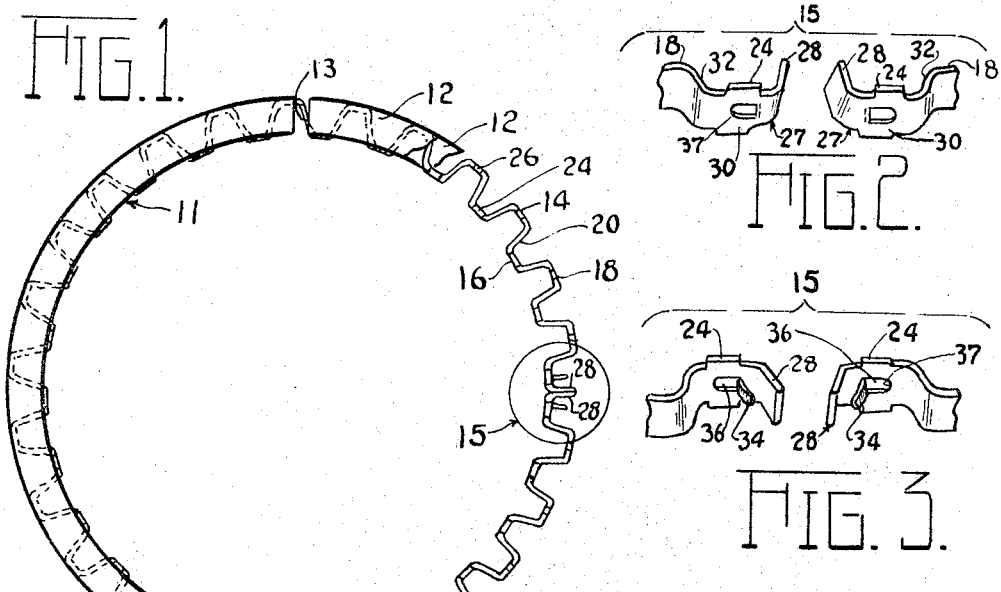
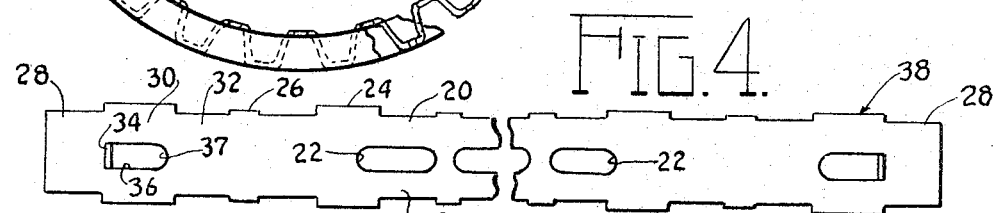
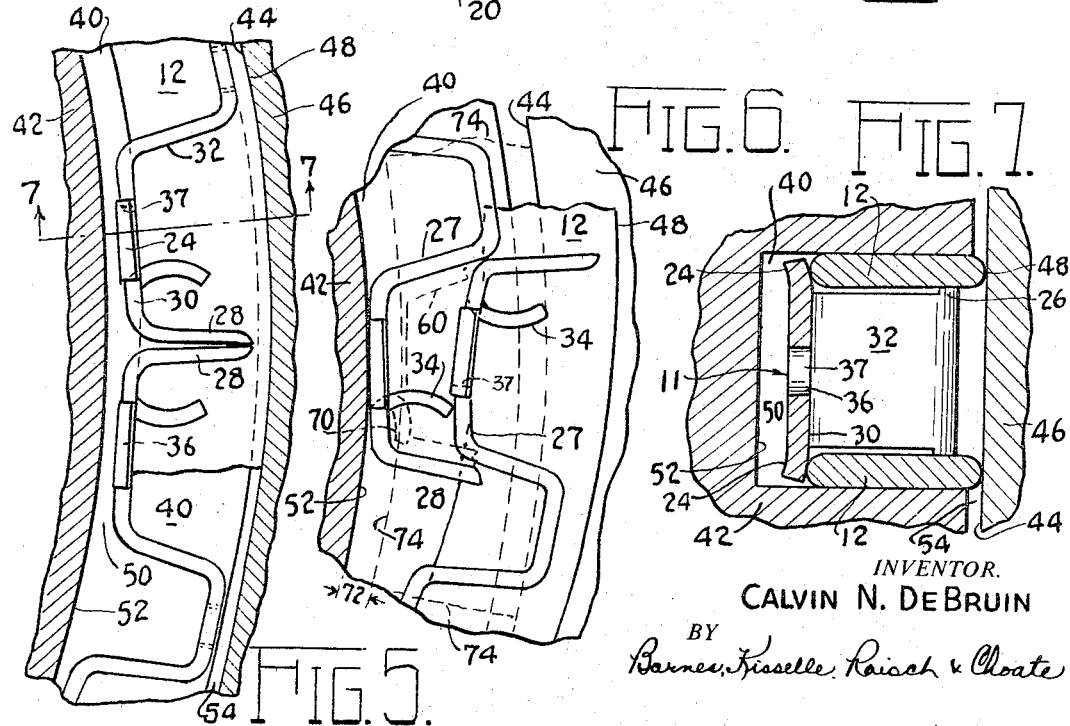
INVENTOR.
CALVIN N. DEBRUIN
BY Barnes, Kisselle, Raisch & Choate
ATTORNEYS

United States Patent Office 3,338,582
Patented Aug. 29, 1967

3,338,582
PISTON RING SPACER - EXPANDER WITH LANCED KEY TO INDICATE OVERLAPPED ENDS
Calvin N. De Bruin, Muskegon, Mich., assignor to Sealed Power Corporation, Muskegon, Mich., a corporation of Michigan
Filed July 14, 1964, Ser. No. 382,519
6 Claims. (Cl. 277—2)

This invention relates to a spacer-expander of a piston oil ring for an internal combustion engine and in particular to an oil ring of the type having a corrugated, parted spacer-expander which must have its ends aligned to function properly.

In many prior art oil rings, a circumferentially compressible spacer-expander is located between upper and lower rails for urging the rails radially outwardly into contact with the bore of the cylinder. Such rings function properly only if the ends of the spacer-expander are abutting when the piston and oil ring assembly is inserted within the cylinder. Such spacer-expanders are self-supporting in that when the spacer-expander ends are abutting and the spacer-expander is compressed circumferentially, it will operate effectively without engaging the bottom of an oil ring groove in the piston. One type of spacer-expander is in the form of a parted ring formed with radially extending corrugations as disclosed in U.S. Letters Patent No. 2,789,872 issued to H. M. Olson on Apr. 23, 1957. However, either prior to or during insertion of the piston within the cylinder, the ends of the spacer-expander may become overlapped inadvertently. With a corrugated spacer-expander of the type disclosed in said Olson patent, if the ends of spacer-expander become overlapped, the overlapping corrugations can nest within one another. In use, the oil ring of the aforementioned patent is spaced radially outwardly from the bottom of an oil ring groove. This spacing is sufficient to accommodate the overlapped ends of the spacer-expander and permit the insertion of a piston and oil ring assembly within the cylinder bore even though the spacer-expander ends are overlapped. When overlapping is present, the spacer-expander will not urge the oil ring outward against the cylinder bore in the manner intended. Improper cooperation between the cylinder bore and the oil ring assembly may result in excessive oil consumption, smoking, and loss of power.

The object of this invention is to provide a spacer-expander that indicates when the ends of the spacer-expander are overlapped by preventing or resisting insertion of the piston and oil ring assembly into a cylindrical bore; that is versatile and that can be made simply and economically.

In the drawings:

FIG. 1 is a top view of an oil ring having a pair of rails, partially broken away, and a spacer-expander made in accordance with the present invention.

FIG. 2 is an enlarged perspective view looking generally in a direction radially outwardly of the spacer-expander and illustrating end portions of the spacer-expander of FIG. 1, with the end portions spaced apart.

FIG. 3 is an enlarged perspective view looking generally in a direction radially inwardly of the spacer-expander to illustrate the end portions of the spacer-expander.

FIG. 4 is a fragmentary view showing end portions of ribbon stock for the spacer-expander of FIG. 1.

FIG. 5 illustrates the oil ring of FIG. 1 disposed in an oil ring groove of a piston which in turn is disposed in a cylinder bore, one of the rails being removed for purposes of illustration.

FIG. 6 illustrates the manner by which the instant invention prevents insertion of an assembled piston and oil ring into a cylinder bore when the ends of the spacer-expander are overlapped.

FIG. 7 is a sectional view taken along lines 7—7 of FIG. 5 with both rails being illustrated.

For purposes of illustration, the parted spacer-expander is basically of the general type disclosed in the previously mentioned patent to Olson, except that the end portions have been modified in accordance with the present invention. An oil ring 11 comprises a pair of parted rails 12, each of which have spaced apart ends defining a gap 13. Rails 12 are supported on opposite edges of a spacer-expander 14, which has end portions indicated generally at 15. End portions 15 are modified in accordance with the present invention in a manner that will later be apparent. Spacer-expander 14 is formed with a consecutive series of alternating inward and outward corrugations comprising inner crowns 16 and outer crowns 18 with adjacent alternately directed crowns connected by generally radial upper and lower legs 20 (FIG. 4), which are separated by slots 22. The upper and lower edges of the inner crowns 16 have lips 24 which engage the inner peripheral edge of rails 12 (FIGS. 1, 5, and 7). The upper and lower edges of outer crowns 18 have lips 26 which space rails 12 (FIG. 7).

The end portions 15 comprise a pair of end corrugations 27, each of which has a generally radial end tab 28 joined to an inner crown 30 which in turn is joined to an adjacent outer crown 18 by a solid generally radial leg 32. A key 34 is lanced from each of the inner crowns 30 to project in a direction radially outwardly of spacer-expander 14 and lie close to the adjacent tabs 28. Keys 34 have a radial dimension less than the radial dimension of legs 32 so that keys 34 do not project beyond the outer periphery of spacer-expander 14. Each of the inner crowns 30 also has a slot 36 formed when keys 34 are lanced. The circumferential distance between each key 34 and its adjacent end tab 28 is less than the circumferential distance between a remote end 37 of slot 36 and the radial leg 32 adjacent end 37, so that the key 34 on one of the end corrugations 27 does not enter the slot 36 on the other of the corrugations 27 when the end corrugations are overlapped. As best shown in FIGS. 5 and 6, keys 34 are slightly curled in a direction toward end tabs 28 as an incident to the lancing operation, although it is to be understood that preferably keys 34 are as straight as possible. In FIGS. 5 and 6, the curl is slightly exaggerated for purposes of illustration. Spacer-expander 14 may be formed from a strip or blank 38 of flat metal ribbon stock as shown in FIG. 4. Preferably, blank 38 is part of a continuous strip of similar blanks that is first shaped at its edges, then perforated, and then corrugated before being severed at the ends of tabs 28. Keys 34 are lanced after the ring or blank 38 is cut off either on an automatic attachment on the press or a separate smaller press.

As explained more fully in the aforementioned Olson patent, oil ring 11 is disposed in an annular oil ring groove 40 of a piston 42 and the piston with the oil ring assembled thereon is inserted in a cylinder bore 44 of a cylinder block 46 (FIGS. 5 and 7). With the piston and oil ring assembly inserted within the bore 44, lips 24 urge rails 12 radially outward to maintain the outer peripheral edges 48 of rails 12 in contact with bore 44. With oil ring 11 retained in the oil ring groove 40 of piston 42 in this manner, and assuming the oil ring is centered in the oil ring groove, there is a radial clearance or space 50 between oil ring 11 and a radially inner bottom 52 of oil ring groove 40. A standard clearance 54 (FIGS. 5 and 7) exists between the radially outer surface of piston 42 and bore 44.

In installation, the oil ring 11 is first slipped over piston 42 into oil ring groove 40. Then, in order to insert the piston and oil ring assembly within cylinder bore 44, rails 12 are circumferentially compressed or contracted to close gap 13 (FIG. 1) and thus reduce the diameter of the oil ring to a dimension equal to or slightly less than the diameter of bore 44. Compression of rails 12 places the spacer-expander 14 in circumferential compression. In prior art oil rings, if the end corrugations are overlapped inadvertently, when the oil ring is compressed the end corrugations nest as indicated generally in broken lines designated by the numeral 60 (FIG. 6). When such prior art oil rings are inserted in the bore of the cylinder with the end corrugations of the spacer-expander overlapped, the oil ring will not perform its intended function.

With the instant invention, however, if the end corrugations 27 are overlapped inadvertently as shown in FIG. 6, one of the keys 34 on one of the end corrugations 27 will engage the radially inner surface on the inner crown 30 of the other overlapped end corrugation 27. As shown in FIG. 6, because the dimension between the free end of key 34 and the end tab 28 of the same end corrugation 27 is less than the dimension between the end 37 of the slot 36 and the leg 32 on the other end corrugation 27, key 34 on the one end corrugation does not enter the slot 36 on the other end corrugation. As shown in FIG. 6, the combined radial dimension of each key 34 plus the thickness of the inner crown 30 from which the key is struck, or stated differently, the radial distance between the free end of the keys 34 and the inner periphery of spacer-expander 14, is substantially greater than the maximum clearance 72 between the inside diameter of the spacer-expander 14 and the bottom 52 of the groove 40. As set forth below, this maximum clearance occurs when the oil ring 11 is fully shifted in groove 40 toward one side of piston 42 so that the ring 11 is bottomed in groove 40 at the opposite side. The key 34 that engages the other overlapped corrugation, restrains contraction of the rails so that the diameter of oil ring 11 through the overlap exceeds the diameter of bore 44 and thus prevents insertion of piston 42 with oil ring 11 assembled thereon into bore 44. This indicates that the ends of spacer-expander 14 are overlapped.

If the force used to contract rails 12 is great enough to collapse the key 34 that normally would provide an indication of overlapped end corrugations, in accordance with a further aspect of this invention, the collapsed key can still provide an indication of overlapped end corrugations when used with some pistons depending on the depth of the oil ring groove. The curl in keys 34 incident to the lancing operation increases the likelihood that keys 34 will collapse in a circumferential direction toward end tabs 28 as indicated in broken lines designated by numeral 70. When key 34 collapses against its juxtaposed inner crown 30, the diameter of oil ring 11 through the overlap is increased by two thicknesses of the material. The thickness of the ribbon stock is chosen such that two thicknesses, together with the radial dimension of the oil ring, that is, the radial thickness of one lip 24 plus the radial thickness of rail 12, exceeds the maximum clearance between the bore 44 and the bottom 52 of the oil ring groove 40. This maximum clearance at the overlap is present when piston 42 is shifted in a direction toward bore 44 to eliminate the clearance 50 at the side of the piston diametrically opposite the overlapped corrugations. In FIG. 6, piston 42 is shown shifted to the left in the cylinder bore 44 a maximum extent so that the radial dimension between bore 44 and bottom 52 of oil ring groove 40 is at a maximum value adjacent the overlapped end corrugations 27. In this position of piston 42, a maximum clearance 72 would be present between bottom 52 of groove 40 and an oil ring properly arranged in bore 44 as illustrated by broken line 74. The maximum clearance 72 with piston 42 shifted to the left is approximately equal to twice the usual clearance 50 shown in FIG. 5. With the present invention, the radial dimension of the collapsed key 34 shown in broken lines at numeral 70, together with the radial thickness through the inner crown 30 exceeds the maximum clearance 72 so that the dimension of oil ring 11 through the overlapped end corrugations 27 exceeds the diameter of the bore 44 to prevent insertion of piston 42 and oil ring 11 therein when the ends are overlapped. The rails cannot be contracted sufficiently to permit insertion of the piston and oil ring assembly within the bore. In other words, when the end corrugations 27 are overlapped and one of the keys 34 is crushed against the inner crown 30 from which it was struck, there are three thicknesses of ribbon stock, that is, two inner crowns 30 and one crushed key 34, between the inner peripheral edge of the rails 12 and the bottom 52 of oil ring groove 40; whereas in prior art devices when nesting occurred, there were only two thicknesses of ribbon stock, that is, two inner crowns 30 corresponding to inner crowns 30. The rails 12, together with two thicknesses of ribbon stock will fit within the maximum clearance between bore 44 and bottom 52 of oil ring groove 40 when the oil ring is not centered, but the rails and three thicknesses will not.

I claim:

1. A spacer-expander for use in a piston and oil ring adapted for insertion into an engine cylinder bore wherein said piston has an oil ring groove for retaining said oil ring, said oil ring comprises flat, parted circular rails with said spacer-expander supporting, spacing and outwardly urging said rails against the wall of said cylinder bore, and wherein there is a predetermined maximum clearance between the bottom of said groove and the radially innermost portion of said oil ring when said piston with said oil ring assembled thereon is operatively disposed in said cylinder, said spacer-expander comprising a parted ring of the self-supporting type, said ring having radial corrugations comprising an alternating series of inner and outer crowns with alternate crowns connected by generally radial legs, one end corrugation of said spacer-expander having a generally radial end tab that abuts the other end corrugation when said ring is in an operative compressed condition, said one end corrugation having a generally radial leg remote from said end tab, said inner crowns defining an inner periphery of said spacer-expander, said outer crowns defining an outer periphery of said spacer-expander, and stop means on said one end corrugation projecting into and terminating within a zone defined radially by said inner said outer peripheries of said spacer-expander and circumferentially by said remote leg and said end tab of said one end corrugation, the combined radial dimension of said stop means and said crown of said one end corrugation being greater than said predetermined maximum clearance whereby if the end corrugations are overlapped the crown on the other end corrugation is engaged by said stop means to restrain nesting of said overlapped end corrugations and thereby restrain radial contraction of said rails so that the diameter of the piston and oil ring assembly through said overlapped end corrugations is greater than the diameter of said cylinder bore to prevent insertion of the piston and oil ring assembly into said cylinder bore.

2. The spacer-expander set forth in claim 1 wherein said stop means is struck from said one end corrugation to form a key having at least a portion struck from the crown of said one end corrugation and said key projects in a direction generally radially of said ring and in the same radial direction as said end tab of said one end corrugation.

3. The spacer-expander set forth in claim 2 wherein said key has a free end positioned closely adjacent but spaced from a first one of either said leg or said end tab of said one end corrugation, a slot in the crown of said one end corrugation formed when said key is struck therefrom, said slot having an end remote from said key and spaced from the other one of either said leg or said tab of said one end corrugation, the distance in a direction circumferentially of said ring between said remote end of said slot and said other leg or tab being greater than the distance in a direction circumferentially of said ring between said free end and said first leg or tab.

4. A spacer-expander for use in a piston and oil ring assembly adapted for insertion into an engine cylinder bore wherein said piston has an oil ring groove for retaining said oil ring, said oil ring comprises flat, parted circular rails with said spacer-expander supporting, spacing and outwardly urging said rails against the wall of said cylinder bore, and wherein there is a predetermined maximum clearance between the bottom of said groove and the radially innermost portion of said oil ring when said piston with said oil ring assembled thereon is operatively disposed in said cylinder, said spacer-expander comprising a parted ring of the self-supporting type, said ring having radial corrugations comprising an alternating series of inner and outer crowns with alternate crowns connected by generally radial legs, one end corrugation of said spacer-expander having a generally radial end tab that abuts the other end corrugation when said ring is in an operative compressed condition, said one end corrugation comprising an inner crown, and means on said one end corrugation separate from said end tab and forming stop means projecting in a direction generally radially outward of said inner crown of said end corrugation, the distance between the radially outermost portion of said stop means and the inner periphery of said spacer-expander being greater than said predetermined maximum clearance whereby if the end corrugations are overlapped, the inner crown on the other end corrugation is engaged by the radially outermost portion of said stop means to restrain nesting of said overlapped end corrugations and thereby restrain radial contraction of said rails so that the diameter of the piston and oil ring assembly through said overlapped end corrugations is greater than the diameter of said cylinder bore to prevent insertion of the piston and oil ring assembly into said cylinder bore.

5. A spacer-expander for use in a piston and oil ring assembly adapted for insertion into an engine cylinder bore wherein said piston has an oil ring groove for retaining said oil ring, said oil ring comprises flat parted circular rails with said spacer-expander supporting, spacing said rails and outwardly urging against the wall of said cylinder bore, said spacer-expander comprises a parted ring of the self-supporting type having radial corrugations comprising an alternating series of inner and outer crowns with alternate crowns connected by generally radial legs, one end corrugation of said spacer-expander includes an inner crown and has an end tab that abuts the other end corrugation when said ring is in an operative compressed condition, said one end corrugation has a radial leg remote from said end tab, said inner crowns define an inner periphery of said spacer-expander, said outer crowns define an outer periphery of said spacer-expander, a zone of potential overlap on said one end corrugation defined radially between said inner and said outer peripheries of said spacer-expander and defined circumferentially between said remote radial leg and said end tab, and wherein the radially innermost portion of said oil ring has a predetermined maximum clearance from the bottom of the oil ring groove when said rails abut the wall of said bore, that improvement comprising a key struck from said inner crown of said one end corrugation to project radially outwardly from said inner crown into said overlap zone, said key terminating within said zone with the terminus of said key spaced radially outward from the inner periphery of the spacer-expander, the distance between the terminus of said key and the inner periphery of said spacer-expander being greater than said predetermined maximum clearance whereby if the end corrugations are overlapped the inner crown on the other end corrugation is engaged by said key on said one end corrugation to restrain nesting of said overlapped end corrugations and thereby restrain radial contraction of said rails so that the diameter of the piston and oil ring assembly through said overlapped end corrugations is greater than the diameter of said cylinder bore to prevent insertion of the piston and oil ring assembly into said cylinder bore.

6. In a spacer-expander for use in a piston and oil ring assembly adapted for insertion into an engine cylinder bore wherein said piston has an oil ring groove for retaining said oil ring, said oil ring comprises flat, parted circular rails with said spacer-expander supporting, spacing and outwardly urging said rails against the wall of said cylinder bore, and wherein there is a predetermined maximum clearance between the bottom of said groove and the radially innermost portion of said oil ring when said piston with said oil ring assembled thereon is operatively disposed in said cylinder, said spacer-expander comprising a parted ring having radial corrugations formed by an alternating series of inner and outer crowns with alternate crowns connected by generally radial leg portions, each end corrugation of said spacer-expander comprising an inner crown and having an end tab that extends at least in part generally radially outwardly of the inner crown and terminates between the inner and outer diameters of the spacer-expander, said end tabs being adapted to abut one another when the spacer-expander is in its operative compressed condition, that improvement wherein each end corrugation has an erect key struck at least in part from the inner crown of the end corrugation so that the inner crowns of the end corrugations are perforated, each key projecting generally radially outwardly from the inner crown in generally the same direction as the end tab of the respective end corrugation, each key has a free end disposed between the inner and outer diameters of said spacer-expander and wherein the combined radial dimension of each key and its respective inner crown is greater than said predetermined maximum clearance whereby if the end corrugations are overlapped, the inner crown on one end corrugation is engaged by the key on the other end corrugation to restrain nesting of said overlapped end corrugations and thereby restrain radial contraction of said rails so that the diameter of the piston and oil ring assembly through said overlapped end corrugations is greater than the diameter of said cylinder bore to prevent insertion of the piston and oil ring assembly into said cylinder bore.

References Cited
UNITED STATES PATENTS

| | | | |
|---|---|---|---|
| 2,789,872 | 4/1957 | Olson | 277—139 |
| 3,105,695 | 10/1963 | Burns et al. | 277—139 X |
| 3,124,362 | 3/1964 | Davis | 277—141 X |
| 3,166,331 | 1/1965 | Warrick | 277—139 |

LAVERNE D. GEIGER, *Primary Examiner.*

J. S. MEDNICK, *Assistant Examiner.*

UNITED STATES PATENT OFFICE
CERTIFICATE OF CORRECTION

Patent No. 3,338,582                          August 29, 1967

Calvin N. De Bruin

It is hereby certified that error appears in the above numbered patent requiring correction and that the said Letters Patent should read as corrected below.

Column 4, line 49, after "inner" insert -- and --; column 5, line 46, for "said rails and outwardly urging" read -- and outwardly urging said rails --.

Signed and sealed this 15th day of October 1968.

(SEAL)
Attest:

Edward M. Fletcher, Jr.                          EDWARD J. BRENNER
Attesting Officer                               Commissioner of Patents